No. 729,710. Patented June 2, 1903.

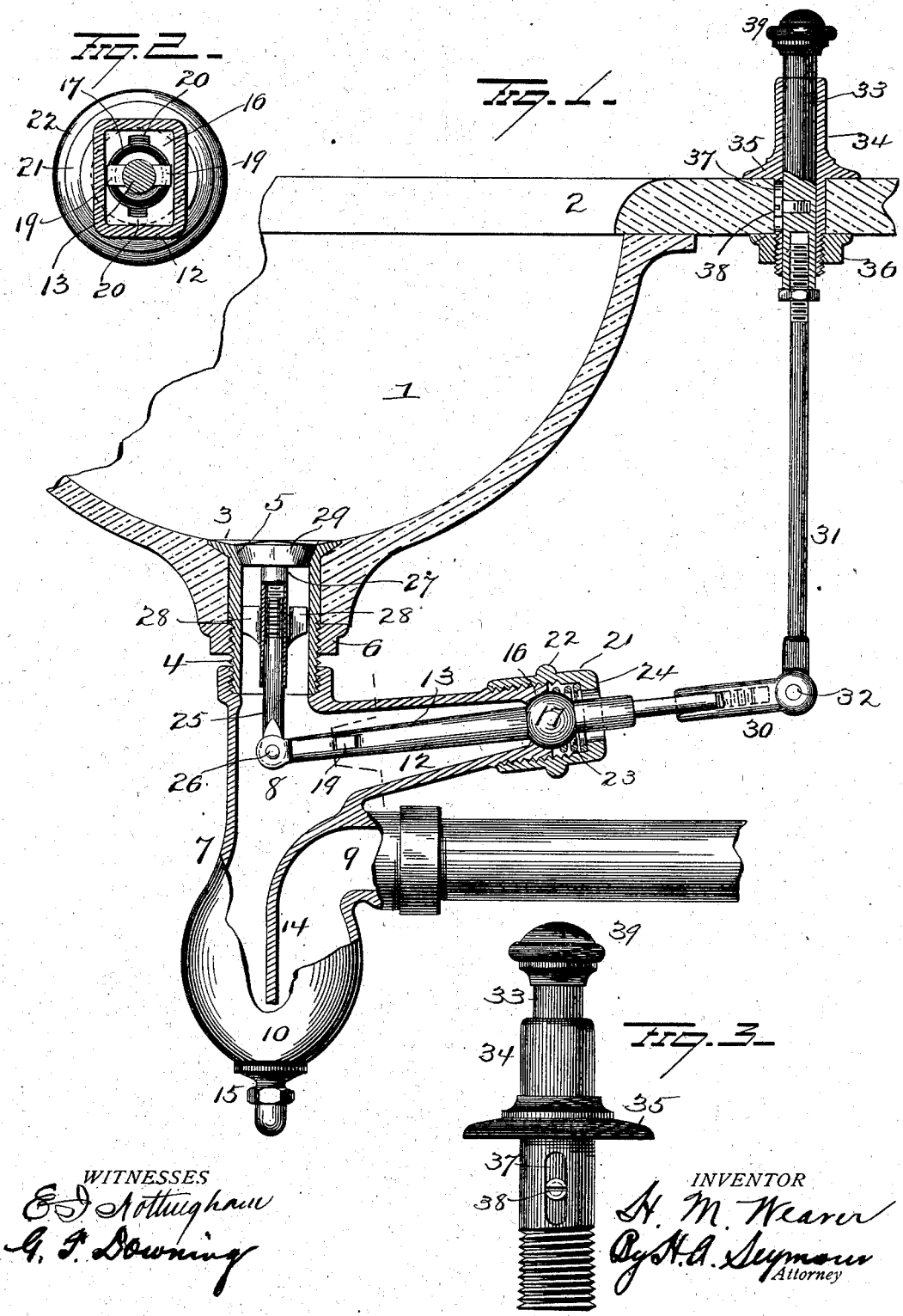

UNITED STATES PATENT OFFICE.

HENRY M. WEAVER, OF MANSFIELD, OHIO.

BATH OR BASIN WASTE.

SPECIFICATION forming part of Letters Patent No. 729,710, dated June 2, 1903.

Application filed August 22, 1900. Serial No. 27,717. (No model.)

*To all whom it may concern:*

Be it known that I, HENRY M. WEAVER, a resident of Mansfield, in the county of Richland and State of Ohio, have invented certain new and useful Improvements in Bath or Basin Wastes; and I do hereby declare the following to be a full, clear, and exact description of the invention, such as will enable others skilled in the art to which it appertains to make and use the same.

My invention relates to an improvement in bath and basin wastes, the object of the invention being to provide a casting forming a combined waste and trap of ornamental appearance and comparatively cheap to manufacture and so mount therein improved means for opening and closing the outlet of the tub or basin as to insure the proper operation of the mechanism and prevent any possibility of leakage of water or the escape of sewer-gas.

A further object is to provide a bath or basin waste which can be readily adjusted to fit any tub or basin and which will when in use form an ornamental and attractive part of the tub or basin.

With these objects in view the invention consists in certain novel features of construction and combinations and arrangements of parts, as will be more fully hereinafter described, and pointed out in the claims.

In the accompanying drawings, Figure 1 is a view in section, illustrating my improvements; and Figs. 2 and 3 are detail views.

1 represents a wash basin or bowl supported by a stand 2 and provided at its lower central portion with a collar 3, having an exteriorly-screw-threaded shank 4, a slightly-beveled valve-seat 5, and a nut 6, which latter is designed to be screwed on the shank 4 after it has been inserted in the bowl or basin and be forced against the bottom thereof to hold the collar 3 tightly in place, and thereby prevent any escape of water around the collar, but permit the ready removal of the same when desired.

A casting 7, internally screw-threaded at its upper end, is adapted to be screwed onto the lower end of shank 4 and comprises the waste-pipe 8, trap 10, outlet-pipe 9, communicating with the latter, and a laterally-projecting hollow arm 12, in which my improved valve-operating lever 13 is mounted.

The trap 10 is made bulbous in shape and provided centrally with a downwardly-projecting partition or dividing-wall 14, which separates the outlet-pipe 9 and waste-pipe 8, thus forming a perfect trap. The lower end of the trap 10 is made with a threaded opening, into which is screwed a plug 15, which can be readily removed when desired to facilitate cleaning the trap.

The hollow arm 12 is flattened on its diametrically opposite sides and made of greatest depth at its inner end, gradually tapering to its outer end, where it is rounded and provided with external screw-threads, as shown, and made internally with a concaved seat 16 for a spherical enlargement or ball 17 between the ends of the lever 13 and on which the latter is fulcrumed. The lever 13 is made near its inner end with oppositely-disposed ribs or enlargements 19 to prevent undue lateral movement of the same, and the concaved seat 16 is made with notches 20 to permit the free passage of the ribs or enlargements 19 when the lever is removed or replaced.

A collar 21, having a peripheral milled flange 22 thereon, is screwed onto the outer threaded end of the arm 12 and is made with an internal flange 24 at its outer end, a coiled spring 23 being inserted on the lever 13 and bears at its respective ends against the flange 24 and ball 17 to hold the latter on the concaved seat 16 with an even pressure at all times, thus effectually preventing leakage past the ball and at the same time exerting sufficient frictional contact to prevent the accidental raising of the plug or valve.

The inner end of the lever 13, which extends into the waste-pipe 8, is bifurcated and pivotally connected to an upright rod 25 by means of a rivet 26, the free end of rod 25 being screw-threaded to receive the tubular internally-screw-threaded lower end of the valve-stem 27, having strainers 28 cast integral therewith or attached thereto and provided on its upper end with a beveled plug or valve 29 to fit closely in the beveled collar 3. The outer end of the lever 13 is screw-threaded to receive a sleeve 30, made internally threaded between its ends to engage the threaded end of the lever and permit the sleeve 30 to be adjusted thereon to accommodate different-sized basins without exposing the screw-threads on the lever. The free end of sleeve 30 is bifurcated and pivotally connected to an upright rod 31 by means of a screw 32. The upper end of the rod 31 is screw-threaded and screwed into a threaded socket in the lower end of plunger 33, mounted in a sleeve 34, which latter is mounted in an opening in the basin-support 2 and provided between its ends with a peripheral enlargement 35, resting on the support and screw-threaded at its lower end to receive a nut 36, forced against the lower face of the support, thus securely holding the sleeve in position. The sleeve is made with a longitudinal slot 37, and a screw or key 38 is secured transversely into the plunger 33, and the movement of the latter is limited by the movement of the key in the slot 37, and the upper end of the plunger 33 is made with an enlargement or handhold 39 to facilitate raising and lowering the same to raise and lower the plug or valve in the basin, as will be hereinafter explained. It will also be seen that the key 38 when secured to the plunger will prevent rotary movement of the same, hence preventing any possibility of the change of the finest adjustment of the length of rod 31.

When it is desired to close the outlet of the basin, it is simply necessary to grasp the handhold 39 and raise plunger 33, which will raise rod 31 and the outer end of lever 13, which latter will have pivotal movement on ball 17 to lower the inner end of the lever, and hence pull the valve-stem 27 down and the valve or plug 29 onto its seat. When the water is to be exhausted from the basin, the plunger 33 is forced downward, and through the mechanism above explained the valve or plug 29 will be raised from its seat and permit the water to pass into waste-pipe 8 and from thence into trap 10 and around the partition 14 to outlet-pipe 9, water always remaining in the trap to the level of the outlet-pipe, thus effectually preventing the sewer-gas from passing the trap.

Slight changes might be resorted to in the general form and arrangement of the several parts described without departing from the spirit and scope of my invention, and hence I would have it understood that I do not limit myself to the precise details set forth, but consider myself at liberty to make such slight changes and alterations as fairly fall within the spirit and scope of my invention.

I have described and shown my improvements in connection with a basin; but it is evident that it is equally adapted for use in connection with a bath-tub, and hence I do not wish to be limited to the use of the same in connection with basins, but consider myself at liberty to use the same in connection with any receptacle to which it may be adapted.

Having fully described my invention, what I claim as new, and desire to secure by Letters Patent, is—

1. In a bath or basin waste, the combination with a hollow arm having a portion angular in cross-section with parallel walls, of a lever mounted at the outer end of said hollow arm, lugs projecting from said lever in the angular portion of the arm, and coöperating with the parallel walls of said angular portion to guide the lever, a plug having a pivotal connection with the inner end of said lever and means connected with the outer end of the lever for operating it.

2. In a bath and basin waste, the combination of a hollow arm communicating with the waste of the bath-tub or basin, a lever fulcrumed in said arm, an upwardly-projecting rod pivotally connected directly to the inner end of said lever, a plug or valve screwed on said rod and adapted to close and open the waste-pipe, a rod pivotally connected to the outer end of said lever, a plunger adjustably connected to said last-mentioned rod, means for mounting said plunger and means for preventing the plunger from turning.

In testimony whereof I have signed this specification in the presence of two subscribing witnesses.

HENRY M. WEAVER.

Witnesses:
HOWARD B. DIRLAM,
N. P. BIGELOW.